United States Patent
Poling et al.

(10) Patent No.: US 7,018,604 B2
(45) Date of Patent: Mar. 28, 2006

(54) COMPOUNDS FOR NOVEL PROTON CONDUCTING MEMBRANES AND METHODS OF MAKING SAME

(75) Inventors: Steven A. Poling, Ames, IA (US); Steve W. Martin, Ames, IA (US); Jacob T. Sutherland, Ames, IA (US)

(73) Assignee: Iowa State University Research Foundation Inc, Ames, IA (US)

( * ) Notice: Subject to any disclaimer, the term of this patent is extended or adjusted under 35 U.S.C. 154(b) by 61 days.

(21) Appl. No.: 10/627,584

(22) Filed: Jul. 25, 2003

(65) Prior Publication Data

US 2004/0096720 A1 May 20, 2004

Related U.S. Application Data

(60) Provisional application No. 60/398,768, filed on Jul. 26, 2002.

(51) Int. Cl.
*C01B 17/00* (2006.01)
*H01B 1/10* (2006.01)
*C01G 17/00* (2006.01)

(52) U.S. Cl. .................. 423/560; 252/519.4; 423/594.9
(58) Field of Classification Search .............. 252/519.4; 423/560, 594.9
See application file for complete search history.

(56) References Cited

U.S. PATENT DOCUMENTS

| | | | | |
|---|---|---|---|---|
| 3,771,073 A | * | 11/1973 | Krause et al. | 333/145 |
| 3,962,141 A | * | 6/1976 | Inoue et al. | 252/501 |
| 4,199,357 A | * | 4/1980 | Yoshida et al. | 430/270 |
| 4,439,411 A | | 3/1984 | Manganaro et al. | 423/560 |
| 4,542,108 A | * | 9/1985 | Susman et al. | 501/40 |
| 4,880,761 A | * | 11/1989 | Bedard et al. | 502/215 |
| 5,531,936 A | * | 7/1996 | Kanatzidis et al. | 252/587 |
| 5,618,471 A | * | 4/1997 | Kanatzidis et al. | 252/582 |
| 5,830,427 A | * | 11/1998 | Bedard et al. | 423/701 |

FOREIGN PATENT DOCUMENTS

WO    WO-0045447 A2    8/2000

OTHER PUBLICATIONS

Krebs, Bernt, et al., "Thio–hydroxoanionen des Germaniums: Darstellung, Struktur und Eigenschaften von $Na_2GeS_2(OH)_2 \cdot 5 H_2O$; Thio–hydroxo Anions of Germanium: Preparation, Structure and Properties of $Na_2GeS_2(OH)_2 \cdot 5 H_2O$", Z. Naturforsch., B: Anorg. Chem., Org. Chem., 36B(11), (1981), 1400–6 (German language with English Abstract).

Krebs, Bernt, "Thio–Hydroxogermanates: a novel type of mixed tetrahedral anions", Inorg. Chim. Acta, 54–4, (1981), L123–L124.

Abe, Yoshihiro, et al., "Electrical conduction due to protons and alkali–metal ions in oxide glasses", Physical Review B (Condensed Matter), 48(21), (Dec. 1, 1993), 15621–5.

Abe, Yoshihiro, et al., "Protonic conduction in alkaline earth metaphosphate glasses containing water", Journal of Non–Crystalline Solids, 51(3), (Nov. 1982),356–65.

(Continued)

*Primary Examiner*—Stanley S. Silverman
*Assistant Examiner*—Jonas N. Strickland
(74) *Attorney, Agent, or Firm*—Schwegman, Lundberg, Woessner & Kluth, P.A.

(57) ABSTRACT

The present invention provides new compounds for use in proton exchange membranes which are able to operate in a wide variety of temperature ranges, including in the intermediate temperature range of about 100° C. to 700° C., and new and improved methods of making these compounds. The present invention also provides new and improved methods for making chalcogenide compounds, including, but not limited to, non-protonated sulfide, selenide and telluride compounds. In one embodiment, the proton conductivity of the compounds is between about $10^{-8}$ S/cm and $10^{-1}$ S/cm within a temperature range of between about –50 and 500° C.

13 Claims, 10 Drawing Sheets

OTHER PUBLICATIONS

Angell, C A., "Mobile Ions in Amorphous Solids", *Annual Review of Physical Chemistry*, 43, (Oct. 1992),693–717.

Blomen, L. et al., eds. , "Fuel Cell Systems", *Copyright 1993, Plenum Press, New York*, ISBN 0–306–44158–6, (1993),xi–xix, 37–69.

Boolchand, P , et al., "Structure of GeS/sub 2/ glass: spectroscopic evidence for broken chemical order", *Physical Review B (Condensed Matter)*, 33(8), (Apr. 15, 1986), 5421–34.

Cho, J , et al., "Infrared spectroscopy study of xRb/sub 2/S+(1–x)B/sub 2/S/sub 3/ glasses and polycrystals in the range 0", *Physics and Chemistry of Glasses*, 36(6), (Dec. 1995),239–43.

Julien, C. , et al., "Solid State Batteries: Materials Design and Optimization", *Copyright 1994, Kluwer Academic Publishers*, ISBN 0–7923–9460–7,(1994),v–viii, 97–175, 183–277.

Kaesaer, J A., "Hydrosulfides of Group I and Group II Metals", *Inorganic Chemistry 12*, (1973), 3019–3020.

Kamitsos, E I., et al., "Structure and optical conductivity of silver thiogermanate glasses", *Journal of Solid State Chemistry*, 112(2), (Oct. 1994),255–61.

Karthikeyan, A , et al., "New method to prepare polycrystalline meta–thioboric acid, (HBS2)3.", *Inorganic Chemistry 41*, (2001),622–624.

Kawamoto, Yoji , et al., "Infrared and Raman spectroscopic studies on short–range structure of vitreous GeS/sub 2/", *Materials Research Bulletin*, 17(12), (Dec. 1982), 1511–16.

Kincs, J , et al., "Non–Arrhenius conductivity in glass: mobility and conductivity saturation effects", *Physical Review Letters*, 76(1), (Jan. 1, 1996),70–3.

Martin, S W., et al., "DC and AC conductivity in wide composition range Li/sub 2/O–P/sub 2/O/sub 5/ glasses", *Journal of Non–Crystalline Solids*, 83(1–2), (Jun. 11, 1986), 185–207.

Martin, S W., et al., "Ionic conduction in phosphate glasses", *Journal of the American Ceramic Society*, 74(8), (Aug. 1, 1991),1767–83.

Martin, S W., et al., "Preparation of high–purity vitreous B/sub 2/S/sub 3/", *Journal of the American Ceramic Society*, 73(11), (Nov. 1990),3481–5.

PPG Industries, "Sodium Hydrosulfide", http://www.ppg.com/chm_chloralk/Bulletins/SodiumHydrosulf.pdf, (Jul. 2002).

Thomas, Sharon , et al., "Fuel Cells: Green Power", *Los Alamos National Laboratory, U.S. Department of Energy*, Publication No., LA–UR–99–3231,(1999),1–36.

Willard, H H., et al., "The preparation and properties of potassium thiogermanate and thiogermanic acid", *Journal of the American Chemical Society* 65, (1943),1887–1889.

Alberti, G, "Solid state protonic conductors, present main applications and future prospects", *Solid State Ionics, Diffusion & Reactions, 145(1–4)*, (Dec. 2001), 3–16.

Colomban, Philippe, "Table of Contents", *In: Proton conductors: solids, membranes, and gels–materials and devices*, Cambridge; New York: Cambridge University Press, (1992).

Dzimitrowicz, D J., et al., "AC proton conduction in hydrous oxides", *Materials Research Bulletin, 17(8)*, (Aug. 1982), 971–9.

Haile, S M., et al., "Solid acids as fuel cell electrolytes", *Nature, 410(6831)*, (Apr. 19, 2001),910–3.

Hara, S, et al., "Proton–conducting properties of hydrated tin dioxide as an electrolyte for fuel cells at intermediate temperature", *Solid State Ionics, Diffusion & Reaction, 154–155*, (Dec. 2002), 679–85.

Kreuer, Klaus–Dieter, "Proton Conductivity: materials and applications", *Chemistry of Materials, 8(3)*, (Mar. 1996), 610–641.

Norby, T, "Solid–state protonic conductors: principles, properties, progress and prospects", *Solid State Ionics, Diffusion & Reactions, 125(1–4)*, (Oct. 1999), 1–11.

Norby, T, "The promise of protonics", *Nature, 410(6831)*, (Apr. 19, 2001),877–8.

Steele, B C., et al., "Materials for fuel–cell technologies", *Nature, 414(6861)*, (Nov. 15, 2001),345–52.

Tricoli, V, "Cs/sup +/–doped poly–perflurosulfonate membranes for application in direct methanol fuel cells", *Proceedings of the Second International Symposium on Proton Conducting Membrane Fuel Cells II*, (1999),358–64.

* cited by examiner

COMPOUNDS FOR NOVEL PROTON CONDUCTING MEMBRANES AND METHODS OF MAKING SAME

This application claims the benefit under 35 U.S.C. 119(e) of U.S. Provisional Application No. 60/398,768 filed on Jul. 26, 2002, which is hereby incorporated by reference in its entirety.

STATEMENT OF GOVERNMENT RIGHTS

This invention was made with support of the United States Government under Department of Energy's Hydrogen Program under Cooperative Agreement No. DE-FC3600GO10531. The Government has certain rights in this invention.

FIELD OF THE INVENTION

The present invention relates to compounds useful for membranes, and, in particular to compounds for novel proton conducting membranes and methods of making same.

BACKGROUND

Hydrogen-based fuel cells are becoming increasingly popular as an alternative to crude oil-based internal combustion engines. Specifically, hydrogen can be converted to electricity through the use of a $H_2$—$O_2$ fuel cell. The by-product of this type of a fuel cell is water, making this a "green" or environmentally friendly technology. At the heart of the fuel cell is the proton exchange membrane (PEM), which transports protons from the anode to the cathode while providing electronic insulation between them. There are many types of electrolyte materials, each with specific limitations. Generally, such materials either have too low a proton mobility or don't operate at a high enough temperature to be useful in fuel cells.

Some of the most popular electrolyte materials are polymer exchange membranes, phosphoric acid membranes, and solid oxide membranes. Polymer exchange membranes, or more specifically solid organic polymer polyperfluorosulfonic acids such as Nafion™, require hydration. However, this limits their operation to temperatures below 100° C., thus requiring the use of expensive noble metal catalysts such as platinum. These electrolytes also suffer from fuel cross-over due to their porous hydrated nature. Phosphoric acid membranes are typically operated from 150° C. to 200° C. Being a liquid electrolyte, these membranes suffer from membrane leakage and fuel cross-over problems. They also require the use of expensive platinum catalysts. Solid oxide membranes are typically operated between 700° C. to 1000° C., where the use of platinum as an electrode material can be reduced. This temperature range is used to achieve the desired oxide anion conductivity. These membranes being solid in nature do not suffer from fuel cross-over problems. With these current fuel cell membrane materials, however, there remains a temperature region between about 100° C. and 700° C. that currently no one membrane can provide for optimum performance. In this temperature range, anhydrous proton conductors are desirable.

Thus, what is needed are new compounds for use in proton exchange membranes which are able to operate in a wide variety of temperature ranges, including in the intermediate temperature range of about 100° C. to 700° C., and new and improved methods of making these compounds.

SUMMARY

The present invention provides new compounds for use in proton exchange membranes which are able to operate in a wide variety of temperature ranges, including in the intermediate temperature range of about 100° C. to 700° C., and new and improved methods of making these compounds. The present invention also provides new and improved methods for making chalcogenide compounds, including, but not limited to, non-protonated sulfide, selenide and telluride compounds. In one embodiment, the proton conductivity of the compounds is between about $10^{-8}$ S/cm and $10^{-1}$ S/cm within a temperature range of between about −50 and 500° C.

In one embodiment, the compound is any cation-modified hydrogen thiogermanate having the $Ge_4S_{10}^{4-}$ complex ion. In one embodiment, new protonated compounds made according to the present invention include, but are not limited to hydrogen-modified thiogermanate compounds with the $Ge_4S_{10}^{4-}$ complex ion having the formulas: $H_xCs_{(4-x)}Ge_4S_{10} \cdot yH_2S \cdot zH_2O$, $H_xRb_{(4-x)}Ge_4S_{10} \cdot zH_2O$ and $H_xK_{(4-x)}Ge_4S_{10} \cdot zH_2O$, wherein $0 < x \leq 4$, $0 \leq y \leq 1$ and $z \geq 0$. Such compounds can therefore have either an adamantane-like or double-decker $Ge_4S_{10}^{4-}$ structural unit. In one embodiment the compounds are hydrated such that $z > 0$. In a particular embodiment, $x=4$ and $z > 0$ and the compound is a hydrated thiogermanic acid, $H_4Ge_4S_{10} \cdot zH_2O$. Such a compound can have either a double-decker or adamantane-like structural unit. In one embodiment $z=0$, and $x=4$ and the compound is the anhydrous thiogermanic acid, $H_4Ge_4S_{10}$, having an adamantane-like structural unit. In one embodiment the $H_4Ge_4S_{10}$ has a conductivity value of about $10^{-10}$ S/cm ($\Omega cm$)$^{-1}$ at 250° C.

In one embodiment, $z=0$ and $x=4$ and the compound is the anhydrous thiogermanic acid, $H_2Ge_4S_9$, having a double-decker structural unit. In one embodiment, the $H_2Ge_4S_9$ has a conductivity value of about $10^{-8}$ S/cm at 360° C.

In one embodiment, the compound is $H_xMoS_{2+x/2+z}$, wherein $1 \leq x \leq 2$ and $0.5 \leq z \leq 1$. In a particular embodiment, the compound is a thiomolybdic acid, including either anhydrous or hydrated forms. In one embodiment, the thiomolybdic acid has a conductivity value of about 0.45 S/cm at 100° C., although the conductivity of this compound is thought to be largely electronic in nature.

Thiogermanic acid can also serve as a proton source material to synthesize other proton conductors. The net result is to create glass/ceramic or ceramic structures with stable S—H groups. IR and Raman spectroscopy have been used to determine the structure of these materials. Structural modifications can also be carried out to maximize the proton concentration and decrease proton-bonding energy.

In one embodiment, various protonated chalcogenide materials are obtained from liquid $H_2S$, $H_2Se$ and/or $H_2Te$ reactions with a variety of precursor materials. In another embodiment, various crystalline sulfides, selenides and tellurides are also obtained from liquid $H_2S$, $H_2Se$ and $H_2Te$ reactions, respectively, with a variety of precursor materials. In one embodiment, the precursor compounds are used individually as commercially supplied. In another embodiment, the precursor has a purity in excess of 99 mole %. This includes precursors selected from the group consisting of chalcogenides, halides, and any combination thereof, to produce a protonated chalcogenide or unprotonated crystalline sulfide, selenide and/or telluride. In one embodiment, precursors are selected from the group consisting of an oxide, sulfide, hydroxide, fluoride, chloride, iodide, bromide, and any combination thereof, to produce a thio-acid, a hydrosulfide or a sulfide.

Structural modifications to the precursor can also be carried out to maximize the proton concentration and decrease proton-bonding energy in the membrane material. In one embodiment, the invention provides a method comprising providing a glass phase, ceramic phase or glass/ceramic phase and allowing this precursor phase to protonate in liquid $H_2S$, $H_2Se$ or $H_2Te$ to produce a protonated membrane material which is chemically and thermally stable. In one particular embodiment, various chalcogenide compounds are solid-state reacted to form a precursor material. This only works if one or more of the precursors produce a protonated chalcogenide upon reacting with liquid $H_2S$, $H_2Se$ or $H_2Te$, for example, $GeS_2 \rightarrow H_4Ge_4S_{10}$. Examples of such compounds that can be solid-state reacted include, but are not limited to, various sulfide, oxysulfide, and/or oxide compounds.

In another embodiment, the glassy, glass-ceramic, and/or crystalline precursor materials are tailored to obtain specific crystalline and/or glass-ceramic reaction products. In one embodiment, the resulting glassy, glass-ceramic, or crystalline precursor materials are reacted with liquid $H_2S$, $H_2Se$ or $H_2Te$ to incorporate protons into the structure. As an example, glasses can be made of $Cs_2Ge_4S_9$, $Rb_2Ge_4S_9$, $K_2Ge_4S_9$ to serve as precursor materials for $H_2Cs_2Ge_4S_{10}$, $H_2Rb_2Ge_4S_{10}$, and $H_2K_2Ge_4S_{10}$, respectively, through reactions with liquid $H_2S$. In another embodiment, the resulting glassy, glass-ceramic, or crystalline precursor materials can be reacted with liquid $H_2S$, $H_2Se$ or $H_2Te$ to produce crystalline sulfide, selenide or telluride materials, respectively.

In one embodiment, the reacting step occurs in a closed one-end tube located inside a reaction vessel. In yet another embodiment, the reaction vessel has a reusable sealing mechanism. The method can further comprise placing the precursor in the reaction vessel; drawing a vacuum inside the reaction vessel; cooling the reaction vessel; filling the reactor with the hydrogen sulfide, hydrogen selenide or hydrogen telluride gas; allowing the gas to liquefy and/or solidify; and allowing the reactor to warm to any suitable reaction temperature; and allowing the reaction to proceed wherein a protonated chalcogenide or crystalline sulfide, selenide or telluride is produced. Examples include, but are not limited to, a thio-acid, hydrosulfide or sulfide. In one embodiment, the reaction vessel is cooled. In a particular embodiment, the reaction vessel is cooled to less than about −60° C. In one embodiment, the method further comprises opening the reactor inside an oxygen- and water-free glove box after the reaction is complete. The products produced according to the novel method of the present invention typically have a purity in excess of 92%. Purity can be increased even further by methods described herein.

The net result is to create ceramic or glass/ceramic structures with structural incorporated protons (protonated) or without protons (unprotonated) crystalline sulfides, selenides or tellurides. Some of these protonated materials, such as various thio-acids or sulfide-based materials doped with hydrogen sulfide ($H_2S$), have been found to be relatively stable in air and water, which is a requirement for $H_2$—$O_2$ fuel cell use. (Structural characterization of the obtained protonated materials was carried out using IR and Raman spectroscopies, DSC, TGA, and X-ray diffraction).

The protonated compounds or membrane materials produced according to one embodiment of the novel method of the present invention can easily be converted to membranes, to provide electrochemical characterizations. One method involves pressing fine powders into a pellet. Other methods which are variations of this technique known in the art can also be used. In one embodiment, the well-known method of thin film processing is used to process thin films of the membrane materials. By using carefully controlled glass-ceramic and/or ceramic processing, the anisotropy and texture of the nanostructures of the membrane materials can be tailored to the perpendicular direction of the thin membrane film, thereby optimizing the conductivity. The mechanical properties may also be optimized through the generation of a two-phase glass-ceramic and/or ceramic membrane with a carefully controlled and fine-grained nanostructure.

Ideally, these membranes will be useful in fuel cells at temperatures between about 100° C. and 700° C. In other embodiments, the membranes may be useful at temperatures less than 100° C., such as approximately 0° C., particularly in applications such as purifiers. In one embodiment, the invention provides a chemically and thermally stable membrane comprising a glass material, ceramic material or glass/ceramic material adaptable for use in a fuel cell at a temperature of between about −60° C. and 700° C., the material having a proton conductivity of between about $10^{-6}$ to $10^{-1}$ S/cm. In other embodiments, the proton conductivity may be greater than $10^{-3}$ S/cm, such as about $10^{-1}$ S/cm. In yet other embodiments, depending on the particular application, proton conductivities as low as about $10^{-7}$ S/cm are used, although such conductivities are likely too low for fuel cell applications, but perhaps useful for hydrogen sensors.

Being solid in nature, these membranes are not expected to exhibit fuel cross-over problems. Because of their inherent increased thermal-mechanical stability, the thermal and electrochemical stability of these membranes may be superior to that of Nafion™ and Nafion™-like polymer membranes above 100° C. The compounds and protonated membranes described herein are useful in a variety of applications, as is known in the art, including fuel cell applications, reformers, purifiers, sensors, and the like.

DETAILED DESCRIPTION

Figure 1:
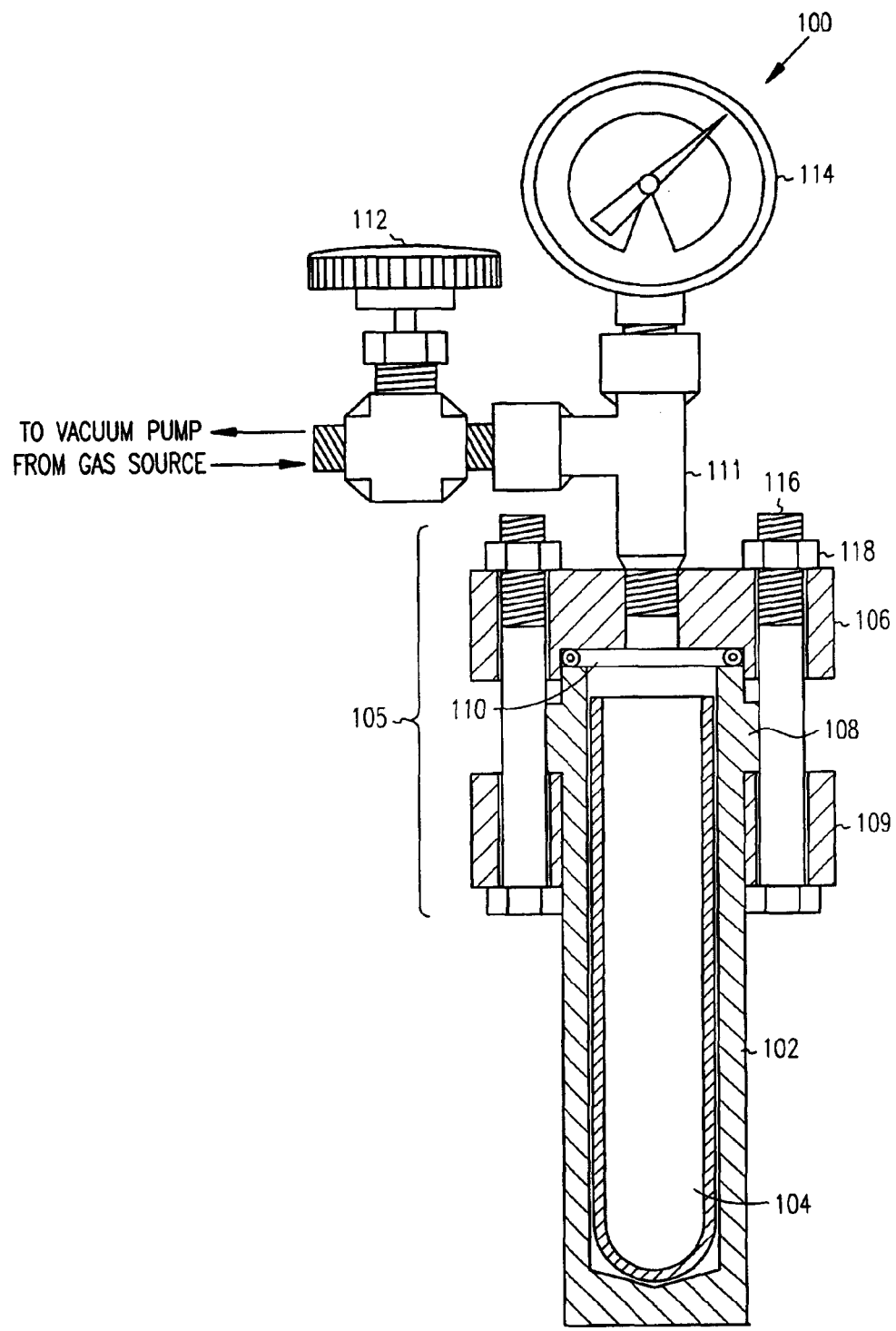
FIG. 1 is a cross-sectional view of a square collar reactor connected to external equipment and used for liquid $H_2S$ reactions in an embodiment of the present invention.

The present invention provides novel compounds for proton conducting membranes and new synthesis methods for producing these and known chalcogenide compounds. The membranes, in turn, are useful as fuel cell electrolyte membranes and other applications. The present invention also provides a new method of making existing compounds, such as thio-acids, sulfides and hydrosulfides using liquid $H_2S$, and provides for their use in proton conducting membranes. These methods of making include the use of precursors, such as oxide and sulfide precursors, among others. For example, oxide precursors identified as having a thio-acid analog (as defined below) have been tested for conductivity as well as thermal and chemical stability. For example, the reaction of $GeO_2$ with liquid $H_2S$ at room temperature produces $H_4Ge_{10}S_{10} \cdot xH_2O$ with a conductivity of about $10^{-3}$ S/cm at room temperature, wherein $0<x<9$. This compound appears to lose the intercalated $H_2O$ at temperatures near 100° C., to yield the thiogermanic acid $H_4Ge_4S_{10}$ or $H_2Ge_4S_9$ which have conductivities of about $10^{-10}$ S/cm at 250° C. and $10^{-8}$ S/cm at 360° C., respectively.

Definitions

The term "thio-acid" as used herein, refers to inorganic $M_aS_bH_c$ or $H_dA_aM_bS_c$ compounds wherein M is a metal or metalloid and A is any metal cation, including, but not limited to, $H_4Ge_4S_{10}$, $H_2Ge_4S_9$, $H_3CsGe_4S_{10}$, $H_3RbGe_4S_{10}$, $H_3KGe_4S_{10}$, $H_2MoS_4$, NaSH, KSH, RbSH, CsSH, $Ba(SH)_2$. These compounds can be assigned specific thio-acid names, such as thiogermanic acid, thiomolybdic acid, thioboric (or metathioboric) acid, and so forth. The specific naming for the alkali and alkaline earth metals is slightly different, i.e., potassium hydrosulfide, cesium hydrosulfide, barium hydrosulfide, etc.

The term "sulfur analog" as used herein, refers to oxide compounds in which the oxygen is replaced by sulfur to become a sulfide compound. For example, the sulfur analog of $In_2O_3$ is $In_2S_3$.

The term "thio-acid analog" as used herein, refers to sulfide, oxide, or hydroxide compounds that produce thio-acids as defined above when reacted in solution with liquid $H_2S$.

The term "adamantane-like" as used herein, refers to inorganic materials with a structure unit resembling that of adamantane, which is the organic compound $C_{10}H_{16}$.

The term "membrane material" as used herein, refers to a "protonated" material or compound, i.e., a material or compound having mobile proton species. Examples include thio-acids and hydrosulfides. A membrane material is produced when protons are added in a protonation step to the chemical structure of the material. For example, in one embodiment of the present invention a glass, ceramic or glass/ceramic material is reacted with liquid hydrogen sulfide to produce a membrane material.

The term "membrane" as used herein refers to proton-conducting solid electrolytes, which can otherwise be described as a densified or solid thin film of membrane material, typically less than one (1) mm in thickness, used for electrochemical characterization of membrane electrode assembles (MEA).

The term "material" as used herein refers to a glass, glass/ceramic, or ceramic phase or compound without structurally incorporated protons.

The term "sulfide" as used herein refers to compounds consisting of the element sulfur, and no other chalcogen.

The term "selenide" as used herein refers to compounds consisting of the element selenium, and no other chalcogen.

The term "telluride" as used herein refers to compounds consisting of the element tellurium, and no other chalcogen.

The term "chalcogenide" as used herein refers to compounds consisting of elements from group VIA (Chemical Abstract Service version) of the periodic table including oxygen, sulfur, selenium, tellurium and any combination thereof.

The term "halide" as used herein refers to compounds consisting of the elements from group VIIA (Chemical Abstract Service version) of the periodic table including fluorine, chlorine, bromine, iodine and any combination thereof.

Methods of Preparation

In one embodiment, the method for preparation of protonated chalcogenides, sulfides, selenides and tellurides, according to the present invention includes placing commercial chalcogenide powders of high purity, i.e., typically in excess of 99 mole %, in a closed one-end tube, such as an alumina tube which, in turn, is placed inside a reaction vessel, i.e., reactor. FIG. 1 provides a simplified cross-sectional view of a typical reactor 100 connected to control equipment, although the invention is not so limited. This reactor design, however, incorporates certain features, such as high temperature re-usability, sealing capability and various other safety features important for safe operation, particularly when operating at high temperatures.

In the embodiment shown in FIG. 1, the reactor 100 is comprised of an outer metal tube (reactor tube) 102 and a removable inner tube 104 with a sealing unit 105 surrounding the outer circumference of the upper portion of the outer tube 102. In this embodiment, the sealing unit 105 is comprised of a reactor top 106, a shear collar 108 integral with the outer tube 102, a square collar 109 secured by four pairs of bolts 116 and nuts 118 located at each corner of the reactor top 106 and one or more seals 110 located between the top of the outer tube 102 and the reactor top 106, as shown, although the invention is not so limited. Any suitable combination of components in any suitable configuration can be used as the sealing unit 105 as long as the reactor 100 can perform its intended function.

In this embodiment, a vacuum is drawn on the reactor contents through an inlet and outlet line 111 by vacuum means known in the art, although the invention is not so limited. Reactions can also take place under any suitable pressure, including under ambient conditions. In an alternative embodiment, a filler gas, such as helium or nitrogen, is used to produce a higher pressure phase in the reaction product or to increase the reaction rate, depending on the kinetics.

The removal of air to create the vacuum (and the flow of components into the reactor 100) is controlled by a needle valve 112, such as the valves made by Swagelock Co. having offices in Solon, Ohio. Pressure within the reactor 100 is monitored by a pressure gauge 114. After evacuating the contents of the reactor 100, the outer tube 102 is placed inside a liquid nitrogen dewer and cooled to liquid nitrogen temperatures. At this point, $H_2S$, $H_2Se$ or $H_2Te$ gas (and/or other reactant precursor gases such as boron chloride) may be back-filled into the reactor 100 via the inlet and outlet line 111, again with the pressure monitored by the pressure gauge 114. The low liquid nitrogen temperatures allow the gas inside the reactor to obtain a liquid and/or solid phase. The reactor 100 may then be warmed by any suitable means such as under ambient conditions or in a furnace, to a suitable temperature for the reaction to proceed. Reactions can take place under any suitable pressure and temperature, including under ambient conditions.

Preferably, the reactor 100 has a re-usable sealing mechanism. In the embodiment shown in FIG. 1, bolts 116 having nuts 118 are provided at each corner of the square collar 109 to provide the re-usable sealing mechanism. The bolts 116 function to hold the reactor top 106 onto the outer tube 104 via the shear collar 106. Thus, the square collar 109 supplies the load from the bolts 116 to the outer tube 102 via the shear collar 106. In this embodiment, four bolts 116 are used (two shown in FIG. 1), although additional or even fewer bolts can be used, as desired, for different reactor designs. Proper selection of bolt size and number is important, however, to insure adequate strength for the applied load from the square collar 109. In other words, the yield strength of the bolts 116 must be greater than the applied load exerted by the gaseous phase on the square collar 109. In most embodiments utilizing this type of re-usable sealing mechanism, the bolts 116 will have a diameter of at least about 0.25 in and a length of about 0.75 to six (6) in, although the invention is not so limited. In one embodiment, 0.375 in-diameter bolts, having a length of about 3.5 in are used when the outer tube 102 has an inside diameter of about one (1) in.

Any suitable material that can withstand high temperatures and is corrosion resistant to $H_2S$, $H_2Se$ and $H_2Te$ and sulfide, selenide and/or telluride vapors can be used for the outer tube 102. Preferably the material used is economical and easily machineable. In one embodiment, stainless steel 316 is used. This material provides adequate corrosion resistance up to approximately 400° C. and is easily machined. At higher temperatures the reaction with the iron becomes significant and so materials must be even more carefully selected. In such embodiments, a liner or coating made from a metal, (e.g., tantalum), ceramic (e.g., aluminum oxide, $Al_2O_3$), or amorphous material (e.g., vitreous carbon or silica) is used to line the outer tube 102.

The outer tube 102 can have any suitable thickness. In a particular embodiment, the outer tube 102 has a wall thickness of approximately 0.2 in. Reactor hoop stress (i.e., the stress in the reactor tube wall acting circumferentially in a plane perpendicular to the longitudinal axis of the reactor tube) is produced by the pressure of the gaseous reactants and is normally used as the limiting stress for safety calculations, as is known in the art.

The size of the outer tube 102 can also vary according to the reactor design. For most experimental operations, the outer tube 102 has an inside volume of between about 50 and 100 mL. In one embodiment, the outer tube 102 has a volume of about 78 mL.

The inner tube 104 which holds the sample can be made from any suitable material able to withstand reaction conditions. In one embodiment the inner tube 104 is made from alumina, silica, polytetrafluoroethylene (i.e., Teflon®). In one embodiment, the tube is an alumina tube designed to be removeably secured inside the inner volume of the outer tube 104 as shown in FIG. 1.

The shear collar 108 of FIG. 1 is round in geometry, although the invention is not so limited. The shear collar 108 can have any suitable thickness as long as it can resist the shear forces to which it is exposed during operation. In embodiments that operate at the vapor pressure of $H_2S$ at room temperature, the shear collar 108 is at least about 0.25 in in thickness. In a particular embodiment, the shear collar 108 has a thickness of about 0.625 in. In other embodiments, a shear collar 108 is not required, and the reactor top 106 can be attached to the outer tube 102 directly through the bolts 116 or other mechanical sealing mechanisms known in the art.

Any suitable type of seal 110 can be used to seal the reactor 100. In one embodiment, the seal 110 is an o-ring designed for temperatures below about 230° C. In a particular embodiment the seal is a Teflon® brand fluorinated ethylene propylene (FEP) o-ring. In another embodiment, the seal 110 is a copper washer-carbon disk composite gasket for higher temperature operation. In yet another embodiment, the seal is a Viton® brand o-ring which are known to be useful for room temperature reactions which can last up to four weeks.

In operation, a vacuum is first drawn inside the reactor 100, which is then cooled by any suitable means, such as with liquid nitrogen as described above. The reactor is then typically filled with $H_2S$, $H_2Se$ or $H_2Te$ gas, such as 99.5% pure gas manufactured by Matheson Tri-Gas Co., having offices in Montgomeryville, Pa. The reactions can take place at room temperature where liquid $H_2S$, $H_2Se$ or $H_2Te$ is present in the reactor under its own vapor pressure. In other embodiments, the temperatures can be about −78 to 230° C. The reactants and/or products may be in solution/suspension with the liquid $H_2S$, $H_2Se$ or $H_2Te$. After the designated reaction time, resulting $H_2S$—$H_2O$ solutions may be evaporated through an aqueous solution of $NH_4OH$ to obtain $NH_4SH$. The $NH_4SH$ solution may then be reacted with $H_2O_2$ to obtain $NH_4OH$ and $S_8$ according to the reactions:

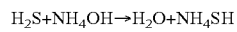

$$H_2S + NH_4OH \rightarrow H_2O + NH_4SH$$

$$NH_4SH + H_2O_2 \rightarrow NH_4OH + H_2O + 1/8 S_8$$

In another embodiment $H_2S$, $H_2Se$ or $H_2Te$ from the resulting reaction solution is recycled by implementing drying materials such as silica gel, anhydrous calcium chloride, such as calcium chloride made by DampRid. Inc., having offices in Orlando, Fla. In another embodiment anhydrous calcium sulfate made by W.A. Hammond Drierite Co. LTD. having offices in Xenis, Ohio, is used. In yet other embodiments, selective pressure swing absorption (PSA) materials or molecular sieves including 3 Å potassium zeolite, or appropriate cold traps (−60° C.<T<0° C.) for $H_2O$ are used to recycle the $H_2S$, $H_2Se$ or $H_2Te$.

In one embodiment, after removal of the $H_2S$, $H_2Se$ or $H_2Te$ solution, the reactor 100 is removed from the control equipment and opened inside an oxygen and water free glove box (<5 ppm) where mass measurements of the resulting product can be recorded as a function of time. Intercalated $H_2O$ may take up to five (5) days to dissipate at room temperature. However, vacuum drying or heating the samples to about 100° C. with about 100 mTorr vacuum may be used to speed this process down to about one (1) day in duration. Water in the resulting product may be identified by infrared spectroscopy, with an O—H stretching mode between about 3300 and 3600 $cm^{-1}$ and a H—O—H bending mode around 1620 $cm^{-1}$. Thio-acids and hydrosulfides may be identified from the presence of the S—H stretching mode around 2500 $cm^{-1}$ (assuming an electronic insulator material). Further characterizations including Raman spectroscopy, thermogravimetric analysis, differential scanning calorimetry and X-ray diffraction may be performed to identify the product.

Methods of increasing the solubility and/or reaction rate include: increasing the reaction temperature or adding small amounts of $H_2O$, $NH_3$, HCl, HI, HBr, etc. to the reactants. Methods of purifying the products may include recycling and reusing the $H_2S$, $H_2Se$ or $H_2Te$ liquid with longer reactions times. Examples of specific syntheses are found in the Examples.

The novel methods of the present invention comprise reacting liquid $H_2S$, $H_2Se$ or $H_2Te$ with chalcogenide or halide precursor materials to create protonated chalcogenides, sulfides, selenides and tellurides. The protonated chalcogenides may then be mixed thermally with other chalcogenide materials in a suitable mixing container to produce a glass material (e.g., if cooled rapidly) or ceramic material (e.g., if cooled slowly). In one embodiment, the suitable reacting container is an evacuated silica tube. In other embodiments, the mixing container is a carbon crucible in a water and oxygen-free glove box or any other means known to those skilled in the art. It is also possible to react various chalcogenide compounds in a silica tube to produce a glass, glass/ceramic or ceramic material, and then react that product with liquid $H_2S$, $H_2Se$ or $H_2Te$. This is possible, for example, when one or more of the chalcogenides produces a chalcogenide-acid or hydrochalcogenide, e.g., $GeS_2 \rightarrow H_4Ge_4S_{10}$. For example, the ceramic material $BaGeS_3$ may protonate in liquid $H_2S$ to produce a chemically and thermally stable membrane material or material useful in membrane applications.

Compounds

Various chalcogenide precursors, as well as halide precursors, and any combination thereof, can be reacted with liquid $H_2S$, $H_2Se$ or $H_2Te$ at room temperature for various lengths of time. As described in the examples below, 25 oxide and hydroxide precursors were tested, although it is likely many other types of precursors can be used to produce useful thio-acids other than the thio-acids produced herein. Referring to the examples, however, of the 25 tested, 14 formed sulfide products in solution with liquid $H_2S$, while the remaining 11 appeared to be relatively inert. Of these 14, seven (7) formed thio-acids or hydrosulfides, namely: $H_4Ge_4S_{10}$ or $H_2Ge_4S_9$, $H_2MoS_4$ or $2Mo_2S_5 \cdot 3H_2S$, NaSH, KSH, RbSH, CsSH $Ba(SH)_2 \cdot xH_2O$, with some compounds forming more than one product. Sulfide precursors were also used to form thio-acids, e.g., $H_4Ge_4S_{10}$, $H_2CaGe_4S_{10}$, $H_2SrGe_4S_{10}$, $H_2BaGe_4S_{10}$, $H_2Cs_2Ge_4S_{10} \cdot xH_2S$, $H_2Rb_2Ge_4S_{10}$ and $H_2K_2Ge_4S_{10}$.

This method of liquid $H_2S$ reactions has also proven effective at increasing the total number of S—H bonded protons in sulfide materials that have one or more compounds which form thio-acid analogs (e.g. $GeS_2+Ga_2S_3$ glasses with thiogermanic acid analog). However, increasing the mobility has proved more challenging, although mixed proton sites may prove to be useful in increasing mobility. For example, $Ba_xGe_yS_{(x+2y)}$ crystals possess two available proton sites since both BaS and $GeS_2$ compounds have thio-acid analogs. Additionally, inert medias (e.g. $GeS_2$, $Ga_2S_3$, $As_2S_3$, $SiO_2$, $Al_2O_3$, etc.) may be mixed with good proton conducting compounds. Various thio-acids may be good proton conductors (e.g. CsSH, RbSH, and KSH) but exhibit extreme solubility in water and extreme ductility at raised temperatures (up to 425° C.). Suited in a glassy matrix with preferential inert properties, these problems may be addressed. A primitive proton conducting ordered phase may also be possible out of the $H_4Ge_4S_{10}$ unit when hydrogen atoms are replaced with large alkali metal cations (e.g. K, Rb, Cs, etc.) in solution.

Table 1 summarizes the various precursor reactions with liquid $H_2S$ that were tested herein, although the invention is not so limited. Various characterizations were done on each; which included total mass increase, Raman, IR, TGA, DSC and XRD. As is discussed herein, the present invention further provides at least two new thio-acids, namely, thiogermanic acid and thiomolybdic acid, formed via the methods described herein. It is expected that other novel thio-acids may also be formed according to the methods of the present invention. Detailed data from these experiments can be found in the Examples below.

TABLE 1

Various Precursor Reactions with Liquid $H_2S$

| OXIDE/HYDROXIDE PRECURSORS | SULFIDE PRECURSORS | BROMIDE/CHLORIDE/IODIDE |
|---|---|---|
| $GeO_2 \rightarrow H_4Ge_4S_{10}$, $H_2Ge_4S_9$, $\alpha$-$GeS_2$ | $GeS_2 \rightarrow H_4Ge_4S_{10}$, $\alpha$-$GeS_2$ | $BBr_3 \rightarrow HBS_2$ |
| $MoO3 \rightarrow 2Mo_2S_5 \cdot 3H_2S$ or $H_2MoS_4$ | $K_{4-x}Ge_4S_{10-x/2} \rightarrow$ $H_xK_{4-x}Ge_4S_{10}$, $\alpha$-$GeS_2$ | $BCl_3 \rightarrow HBS_2$ |
| $NaOH \rightarrow NaSH$ | $Rb_{4-x}Ge_4S_{10-x/2} \rightarrow$ | $SnI_2 \rightarrow$ no reaction |
| $KOH \rightarrow KSH$ | $H_xRb_{4-x}Ge_4S_{10}$, $\alpha$-$GeS_2$ | |
| $RbOH \rightarrow RbSH$ | $Cs_{4-x}Ge_4S_{10-x/2} \rightarrow$ | |
| $CsOH \rightarrow CsSH$ | $H_xCs_{4-x}Ge_4S_{10} \cdot yH_2S$, $\alpha$-$GeS_2$ | |
| $Ba(OH)_2 \rightarrow Ba(SH)_2 \cdot xH_2O$ | $Ba_{2-x}Ge_4S_{10-x} \rightarrow$ | |
| $As_2O_3 \rightarrow As_2S_3$ | $H_{2x}Ba_{2-x}Ge_4S_{10}$, $\alpha$-$GeS_2$ | |
| $Sb_2O_3 \rightarrow Sb_2S_3$ | $Sr_{2-x}Ge_4S_{10-x} \rightarrow$ | |
| $Bi_2O_3 \rightarrow Bi_2S_3$ | $H_{2x}Sr_{2-x}Ge_4S_{10}$, $\alpha$-$GeS_2$ | |
| $Ga_2O_3 \rightarrow Ga_2S_3$ | $Ca_{2-x}Ge_4S_{10-x} \rightarrow$ | |
| $In_2O_3 \rightarrow In_2S_3$ | $H_{2x}Ca_{2-x}Ge_4S_{10}$, $\alpha$-$GeS_2$ | |
| $WO_3 \rightarrow WS_3$ or $WS_2$ | $BaS \rightarrow Ba(SH)_2$ | |
| $V_2O_5 \rightarrow V_2S_5$ or $VS_2$ | $MoS_2 \rightarrow 2Mo_2S_5 \cdot 3H_2S$ or $H_2MoS_4$ | |
| $TiO_2 \rightarrow$ no reaction | $ZnS \rightarrow$ no reaction | |
| $P_2O_5 \rightarrow$ no reaction | $Cu_2S \rightarrow$ no reaction | |
| $ZrO_2 \rightarrow$ no reaction | | |
| $La_2O_3 \rightarrow$ no reaction | | |
| $SnO_2 \rightarrow$ no reaction | | |
| $H_2SiO_3 \rightarrow$ no reaction | | |
| $Al(OH)_3 \rightarrow$ no reaction | | |
| $Eu_2O_3 \rightarrow$ no reaction | | |
| $Ce_2O_3 \rightarrow$ no reaction | | |
| $B_2O_3 \rightarrow$ no reaction | | |
| $H_3BO_3 \rightarrow$ no reaction | | |

As noted above, the present invention provides, in one embodiment, measurable proton conductivity in hydrous and anhydrous chalcogenide samples and further demonstrates thermal and chemical stability. In developing new proton conducting membrane materials, it is important to test the diffusion behavior of protons in the respective materials. Proton conducting samples can be tested using a.c. impedance measurements. Proton self-diffusion coefficients of these proton conducting samples can be determined from $H^1$-NMR spin-echo pulse sequences with magnetic field gradient pulses. Thermal and chemical stability of these proton conducting samples can be measured using thermogravimetric analysis where non-reactive atmospheres, such as nitrogen or argon, can be used to determine the thermal stability of the sample, and reactive atmospheres of oxygen and water vapor can be used to determine the chemical stability of the sample. Thereafter, for samples possessing both good proton conductivity and thermal and chemical stabilities, a working membrane can be fabricated to which a pressure differential of hydrogen can be applied.

In all the Examples described herein, various protonated sulfide materials were obtained from liquid $H_2S$ reactions with a variety of precursor materials. Various crystalline sulfide materials were also obtained from liquid $H_2S$ reactions with a variety of precursor materials. Precursor materials tested herein include sulfides (Examples 2–5), oxides (Examples 2, 3, 5 and 6) and hydroxides (Example 1). Additionally, the glassy and/or crystalline precursor materials were tailored to obtain specific crystalline and/or glass-ceramic reaction products, as described in Examples 4 and 5. Specifically, various sulfide and/or oxide compounds were solid state reacted, e.g. inside evacuated silica tubes. (Examples 2, 4 and 5). In other tests, the compounds were used individually as commercially supplied. (Examples 1–3 and 6). The resulting glassy, glass-ceramic, or crystalline precursor materials were then reacted with $H_2S$ to incorporate S—H bonds into the structure and produce membrane materials.

Generally, the reaction time was found to be very dependent on the water content, both impurity or added, in the $H_2S$. Additionally, the reaction temperature can be increased, such as was done in Example 2, to increase the reaction rate. After the designated reaction time, the resulting $H_2S$—$H_2O$ solution was evaporated through an aqueous solution of $NH_4OH$. In many cases, such as in Examples 2, 4 and 6), the initial reaction product was a protonated sulfide material, an unprotonated reaction product obtained from longer reaction times. The resulting reaction products had various impurity and/or intercalated products, depending on the starting precursor materials, e.g., $H_2S$ and $H_2O$. Vacuum drying or other suitable distillation and/or precipitation reactions were used to purify the reaction products.

Figure 2:
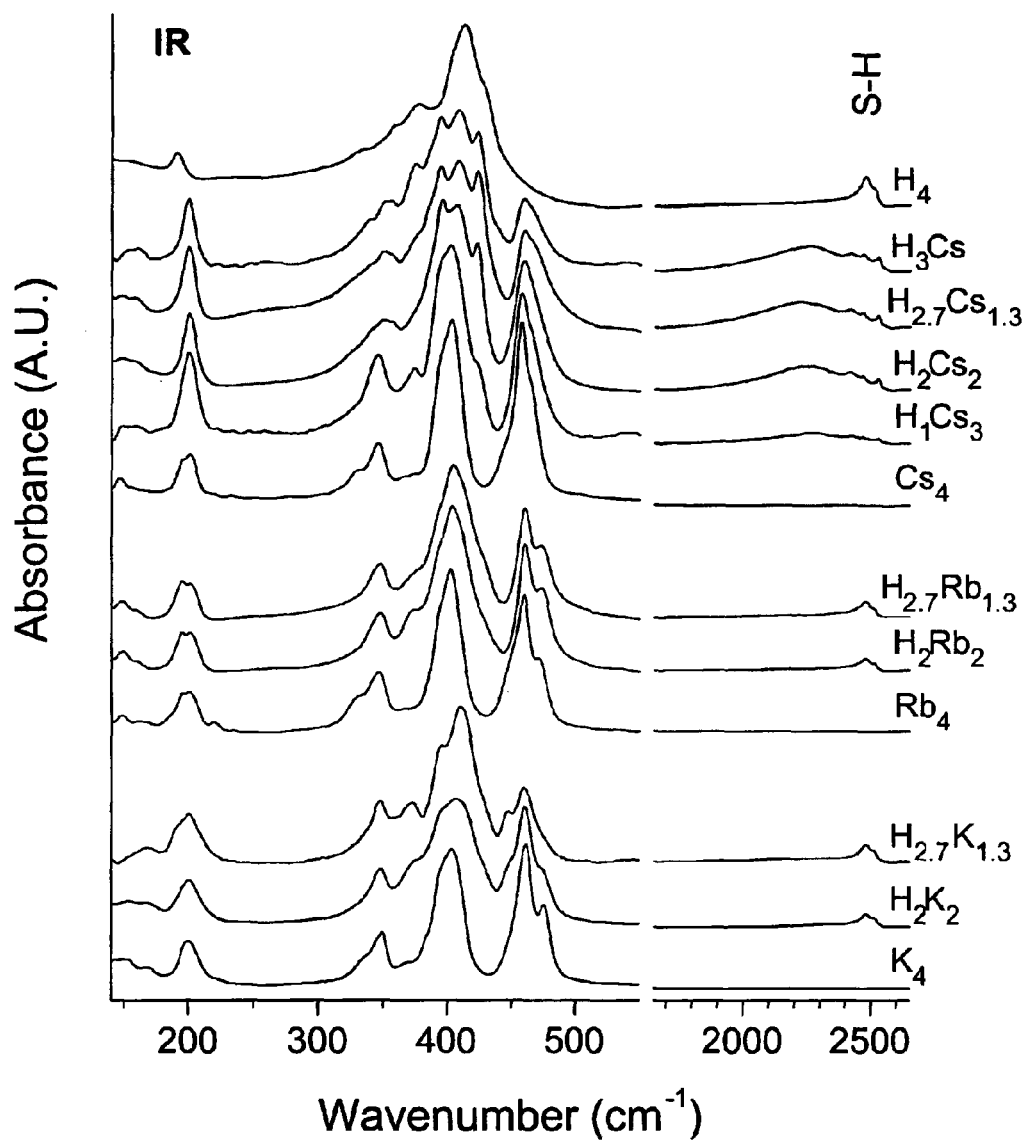
FIG. 2 shows far-IR and mid-IR spectra of hydrogen alkali thiogermanates in embodiments of the present invention.

FIG. 2 shows the far-IR and mid-IR spectra of hydrogen alkali thiogermanates in various embodiments of the present invention. The far-IR presents vibrational bands of the adamantane-like unit cage, whereas the mid-IR presents bands attributed to S—H stretching mode. A broad mode at about 2250 $cm^{-1}$ is observed for the cesium modified systems suggesting strong hydrogen bonding of intercalated $H_2S$. Details of these compounds are discussed below in Examples 2 and 4.

Figure 3:
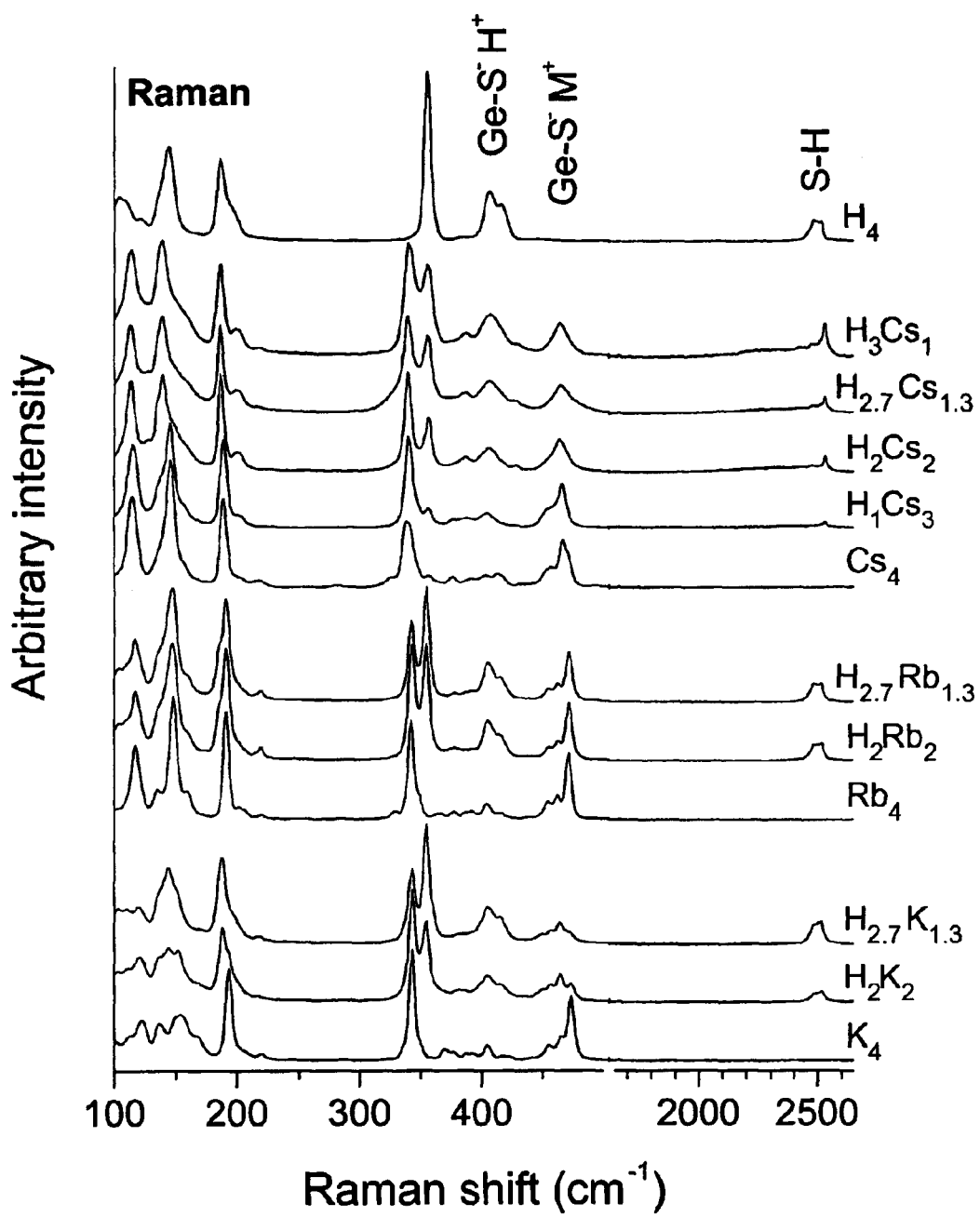
FIG. 3 shows Raman spectra of hydrogen alkali thiogermanates in embodiments of the present invention.

FIG. 3 shows Raman spectra of hydrogen alkali thiogermanates in various embodiments of the present invention. The lower frequency (<500 $cm^{-1}$) vibrational bands are consistent with adamantane-like $Ge_4S_{10}^{4-}$ anions terminated by a mix of hydrogen and alkali cations. In the higher frequency region, a S—H stretching mode is observed about 2500 $cm^{-1}$. Details of these compounds are discussed below in Examples 2 and 4.

Uses

As noted above the protonated membranes containing the compounds described herein are useful in fuel cell applications. However, as those skilled in the art understand, the ability of a membrane to transport protons is also useful in hydrogen reformers, purifiers and sensors.

The present invention will be further described in the following non-limiting Examples:

EXAMPLE 1

Reactor

A reactor similar to the reactor shown in FIG. 1 was used for all Examples described herein. This particular reactor was made of stainless steel type 316 material. Bolt sizes of 0.375-in diameter and 3.5 in in length were used. The outer tube (102 in FIG. 1) had an inside diameter of approximately 1.05 in and a wall thickness of about 0.23 in. A Teflon® brand FEP o-ring was also used as the seal (110) between the outer tube and the square top (102 and 106, respectively, in FIG. 1). An alumina tube (104) was used to hold the samples and the total free volume inside the reactor, i.e., free volume of the outer tube 102 with the inner tube 104 inside was approximately 72 mL (i.e., the volume of the outer tube 102 was 78 mL, with the inner alumina tube 104 having a six (6) mL volume.

Structural Characterization

Structural investigations of the reaction products for all Examples were performed using a Bruker IFS 66v/S Far-IR and Mid-IR spectrometer and a Bruker RFS 100/S Raman spectrometer. Various vibrational modes may be IR, Raman, or active with both spectroscopy methods. Additionally, XRD was performed on single crystals and/or powders. Structural investigations before and after exposure were used to determine stability with $H_2O$ and $O_2$. Exposure time varied from a few hours to one month depending on reactivity of the select samples.

Conductivity Measurement a.c. impedance data was collected on the protonated reaction products, i.e., membrane materials, in all Examples in the same manner. Additionally, the conductivity of the precursor materials was measured to determine if the protonation has indeed increased the conductivity. A Gamry PC4/750 potentiostat was used in the frequency range of 0.2 Hz to 100 kHz using 0.5 V amplitude on pressed powder samples. Hardened steel blocking electrodes pressed into a Teflon sleeve sealed the cooled hydrous and anhydrous powder samples for liquid nitrogen temperatures up to 290° C. An alumina tube was used to contain anhydrous powder samples for higher temperature measurements up to 500° C. Sixty (60) mg to 100 mg of each sample was pressed inside the ¼ inch ID Teflon sleeves or alumina tubes using about 82 kpsi of pressure with pellet thickness ranging from 0.6 mm to one (1) mm. Constant contact pressure was maintained on the pellet/electrode assembly during the measurement by a metal frame insulated from the electrodes with Teflon or alumina. During the measurement, the sample was contained in a silica cell that maintained about one atmosphere pressure of helium. Cold measurements were performed by dipping the bottom of the cell in liquid nitrogen and allowing the liquid nitrogen to slowly evaporate over a period of about 12 hours; data was collected every 5° C. while the cell warmed to room temperature. Above room temperature, the bottom of cell was placed in a custom-built crucible furnace. Data was collected after the sample temperature stabilized for half an hour using increments of 10° C. or 15° C.

Thermal Stability

A Perkin Elmer Thermogravimetric Analyzer TGA 7 (TGA) and a Perkin Elmer Differential Scanning Calorimeter Pyris 1 (DSC) were used to determine the thermal stability of the protonated reaction products in all Examples, including decomposition, sublimation, crystallization, and glass transition temperatures. For purposes of these experiments, the thermal stability limit is defined as the maximum temperature in an inert atmosphere with no decomposition or sublimation. Nitrogen was used as the sample purge gas to prevent any oxidation reactions for all experiments. For DSC experiments 5 mg to 15 mg of fine powder was sealed inside crimped aluminum sample pans. For TGA experiments about 25 mg of each sample was placed inside an aluminum sample pan. A heating rate of 10° C. per minute was used for all thermal stability experiments.

Alkali and Alkaline Earth Hydrosulfides from Hydroxide Precursors

In this test, the anhydrous alkali hydrosulfides of NaSH, KSH, RbSH, and CsSH and the hydrated alkaline earth hydrosulfide of $Ba(SH)_2 \cdot xH_2O$ were synthesized from liquid $H_2S$ reactions with the corresponding hydroxides (0.5 to 3 g) of NaOH, KOH, RbOH, CsOH, and $Ba(OH)_2$, respectively. Typically, these reactions were done at room temperature (about 25° C.) with liquid $H_2S$ (7 to 21 g) at its vapor pressure of about 267 pounds per square inch (psia) for a period of weeks (14 to 21 days).

The reaction routes may be written as follows:

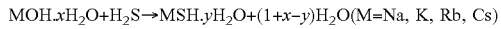

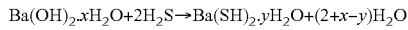

wherein $0 \leq x \leq 8$ and $0 \leq y < 10$.

The removal of the intercalated water from the reaction products for the alkali hydrosulfides may be facilitated through vacuum drying, i.e. heating the samples about 100° C. with about 100 mTorr vacuum for a day. The products may be further purified (if so desired) by repeating the $H_2S$ reaction procedure. In contrast, the intercalated water for barium hydrosulfide proved to be difficult to remove, without decomposing the hydrosulfide product. However, anhydrous $Ba(SH)_2$ may be produced from liquid $H_2S$ reactions with BaS. It is worth mentioning that this processing route may have potential application for producing relatively pure hydrosulfide products at room temperature and these products are not readily available commercially.

Figure 4:
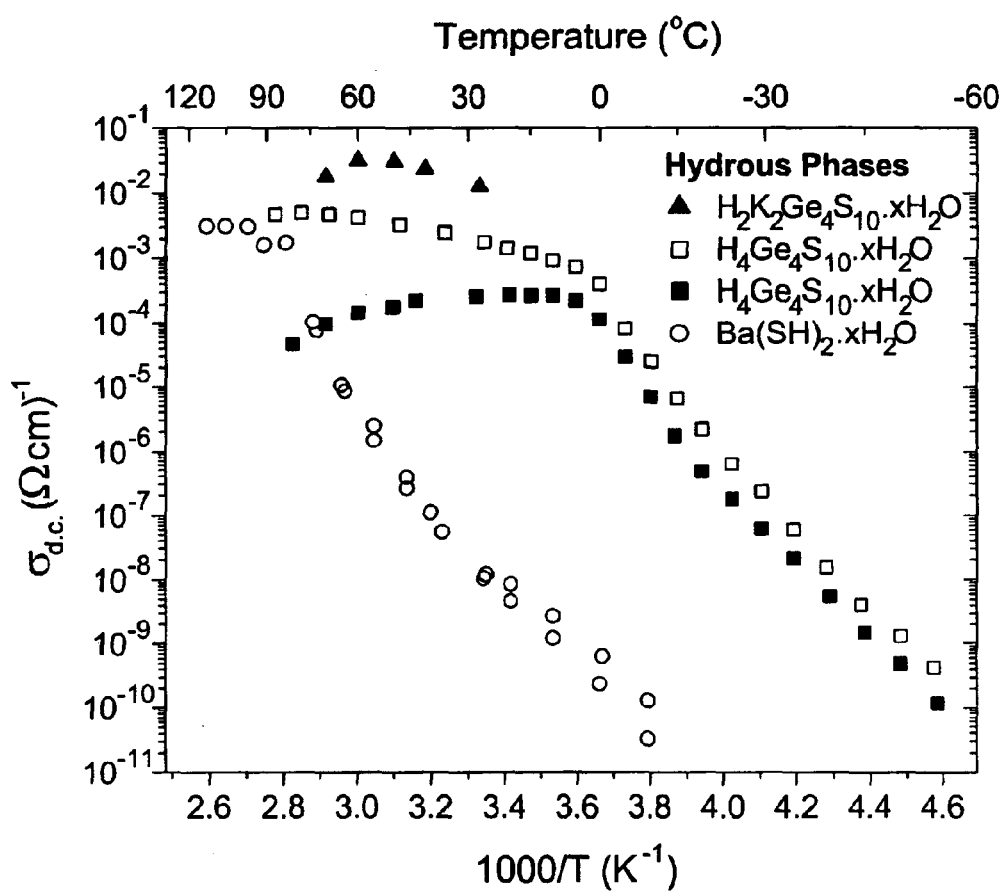
FIG. 4 is an Arrhenius temperature dependent plot of d.c. conductivity values for hydrated forms of specific hydrogen alkali thiogermanates, thiogermanic acids, and barium hydrosulfide in embodiments of the present invention.

The d.c. conductivity values as a function of temperature of the hydrated barium hydrosulfide phase, which is closely linked to the presence of the intercalated water for fast proton conductivity, can be observed between 85° C. to 120° C. See, for example, FIG. 4, which is an Arrhenius temperature dependent plot of d.c. conductivity values for hydrated forms of specific hydrogen alkali thiogermanates, thiogermanic acids, and barium hydrosulfide in various embodiments of the present invention. Fast proton conductivity is realized below about 100° C. associated with presence of intercalated $H_2O$.

Figure 5:
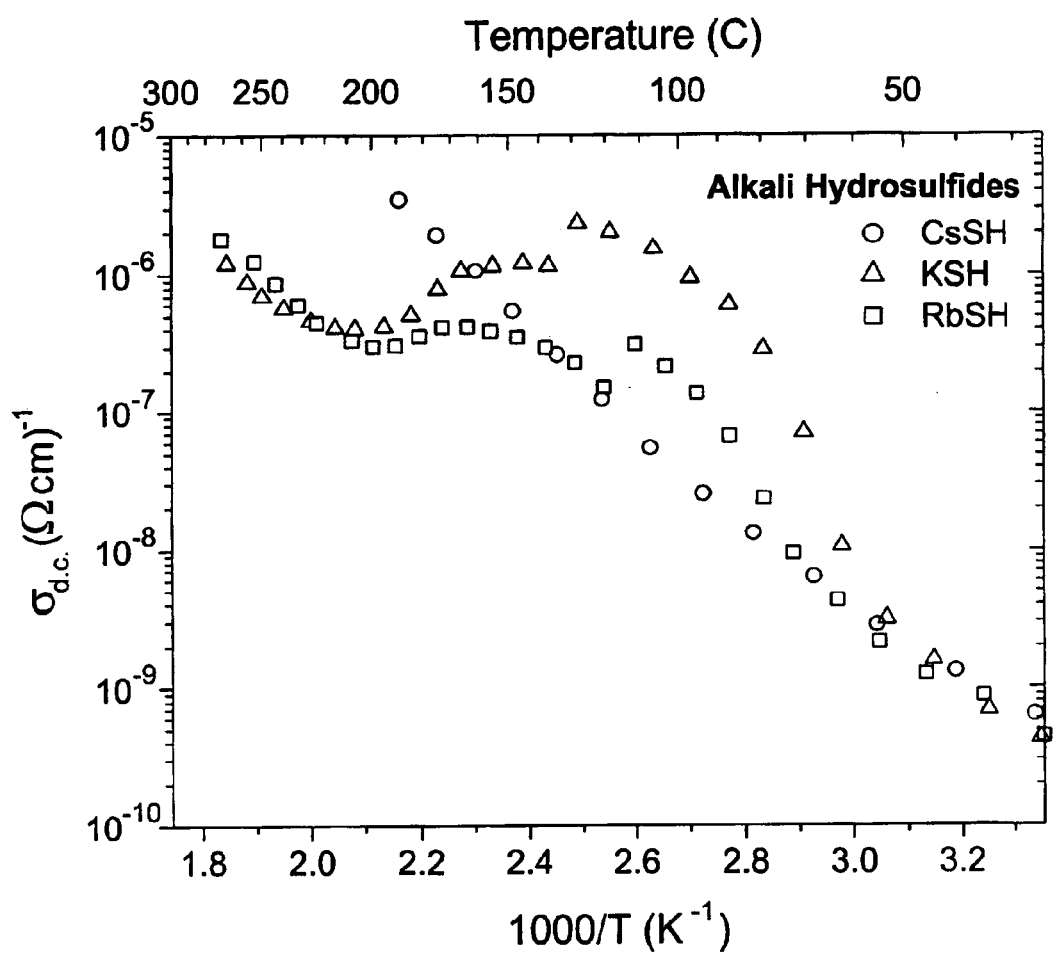
FIG. 5 is an Arrhenius temperature dependent plot of d.c. conductivity values for the anhydrous heavy alkali hydrosulfides in embodiments of the present invention.

The d.c. conductivity of the anhydrous alkali hydrosulfide phases are believed to be attributed to a free-proton transport mechanism and related to specific polymorphs as a function of temperature. See, for example, FIG. 5 which is an Arrhenius temperature dependent plot of d.c. conductivity values for the heavy alkali hydrosulfides in embodiments of the present invention. The decrease in conductivity for KSH and RbSH between 110° C. to 130° C. is associated with a first order phase transition. At higher temperatures, decomposition is observed and alkali mobility is suspected (not shown). As FIG. 5 shows, thermal decomposition is observed about 105° C. for $Ba(SH)_2$ and about 550° C. for the heavy alkali sulfides.

EXAMPLE 2

Thiogermanic Acids from Oxide and Sulfide Precursors

All test conditions were as described above in Example 1. However, in this test, anhydrous thiogermanic acids $H_4Ge_4S_{10}$ and $H_2Ge_4S_9$ were synthesized by reacting glassy $GeS_2$ (0.5 g) or quartz-type $GeO_2$ (0.5 to 3 g) with gaseous and liquid $H_2S$. Typically, these reactions were done at room temperature (about 25° C.) with liquid $H_2S$ (7 to 21 g) at its vapor pressure of about 267 psia. Higher temperature reactions, e.g., ~200° C., were also performed with gaseous $H_2S$. The reactions were performed with and without the addition of water (0 to 57 mg) to the $H_2S$. The reaction products were found to vary as a function of the reaction time (3 to 84 days) and water content. Two reaction routes are noted: anhydrous and hydrous.

The anhydrous reaction route may be written as follows:

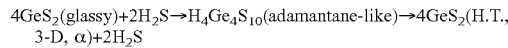

The hydrous reaction route may be written: $4GeO_2$ (quartz-type)$+10H_2S \rightarrow H_4Ge_4S_{10}$(adamantane-like)$\cdot xH_2O + (8-x)H_2O \rightarrow H_4Ge_4S_{10}$(double-decker)$\cdot yH_2O+(8-y)H_2O \rightarrow H_2Ge_4S_9$(double-decker)$+H_2S+8H_2O$ wherein $0 \leq x$, $y < 9$.

Figure 6:
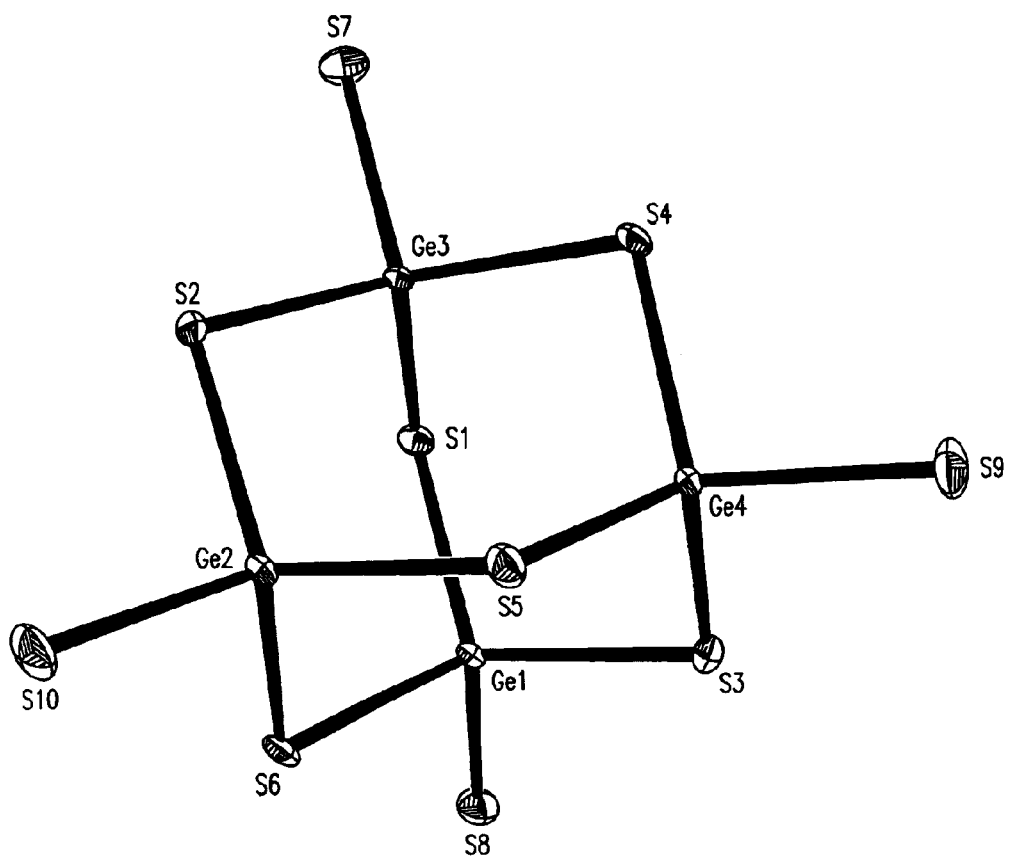
FIG. 6 is an Oak Ridge (Molecular Lab) Thermal Ellipsoid Program (Molecular Modeling) (ORTEP) drawing of the $Ge_4S_{10}^{4-}$ anion for the thiogermanic acid $H_4Ge_4S_{10}$ showing 50% probability thermal ellipsoids, with H atoms omitted for clarity in an embodiment of the present invention.

The resulting reaction products were the adamantane-like $H_4Ge_4S_{10}$ thiogermanic acid, the double-decker $H_2Ge_4S_9$ thiogermanic acid, and the high temperature 3-D $\alpha$-$GeS_2$. See FIG. 6, which is an ORTEP drawing of the $Ge_4S_{10}^{4-}$ anion for the thiogermanic acid $H_4Ge_4S_{10}$ showing 50% probability thermal ellipsoids, with H atoms omitted for clarity. The hydrous reaction route initially produced hydrous $H_4Ge_4S_{10} \cdot xH_2O$ phases for both the adamantane-like and double-decker structural units. The d.c. conductivity values as a function of temperature of these hydrous phases were closely linked to the presence of the intercalated water (See FIG. 4). In fact, fast proton conductivity was observed between 0° C. to 100° C.

Figure 7:
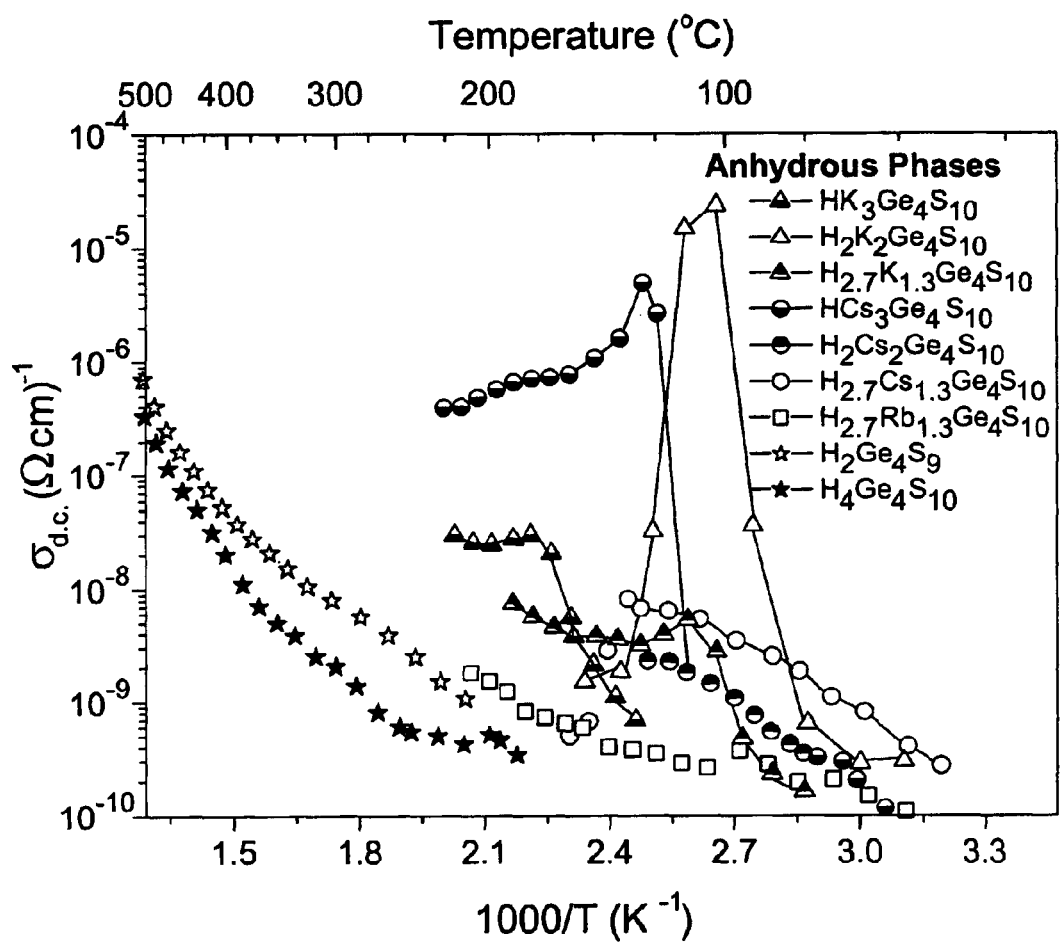
FIG. 7 is an Arrhenius temperature dependent plot of d.c. conductivity values for specific anhydrous hydrogen alkali thiogermanates in embodiments of the present invention.

The d.c. conductivity of the anhydrous phases is believed to be attributed to a free-proton transport mechanism. See FIG. 7, which is an Arrhenius temperature dependent plot of d.c. conductivity values for specific hydrogen alkali thiogermanates in various embodiments of the present invention. Lines are drawn as guides for the eyes. As FIG. 7 shows, the adamantane-like $H_4Ge_4S_{10}$ thiogermanic acid decomposed at approximately 250° C., whereas the double-decker $H_2Ge_4S_9$ thiogermanic acid decomposed at approximately 360° C.

EXAMPLE 3

Thiomolybdic Acid from Oxide and Sulfide Precursors

All test conditions were as described above in Example 1. However, in this test, a thiomolybdic acid, $H_xMoS_{2+x/2+z}$, was synthesized from both hydrous and anhydrous reactions with liquid $H_2S$, wherein $1 \leq x \leq 2$ and $0.5 \leq z \leq 1$. The hydrous and anhydrous reactions were performed using $MoO_3$ (0.75 g) and $MoS_2$ (0.75 g), respectively, as precursor materials with the commercially supplied $H_2S$. These reactions were done at room temperature (about 25° C.) with liquid $H_2S$ (about 17 g) at its vapor pressure of about 267 psia. The resulting reaction product appeared to be independent of reaction time (14 to 84 days).

The anhydrous and hydrous reaction routes may be generally written, respectively, as follows:

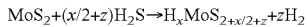

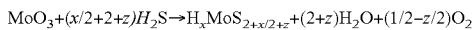

wherein $1 \leq x \leq 2$ and $0.5 \leq z \leq 1$.

Figure 8:
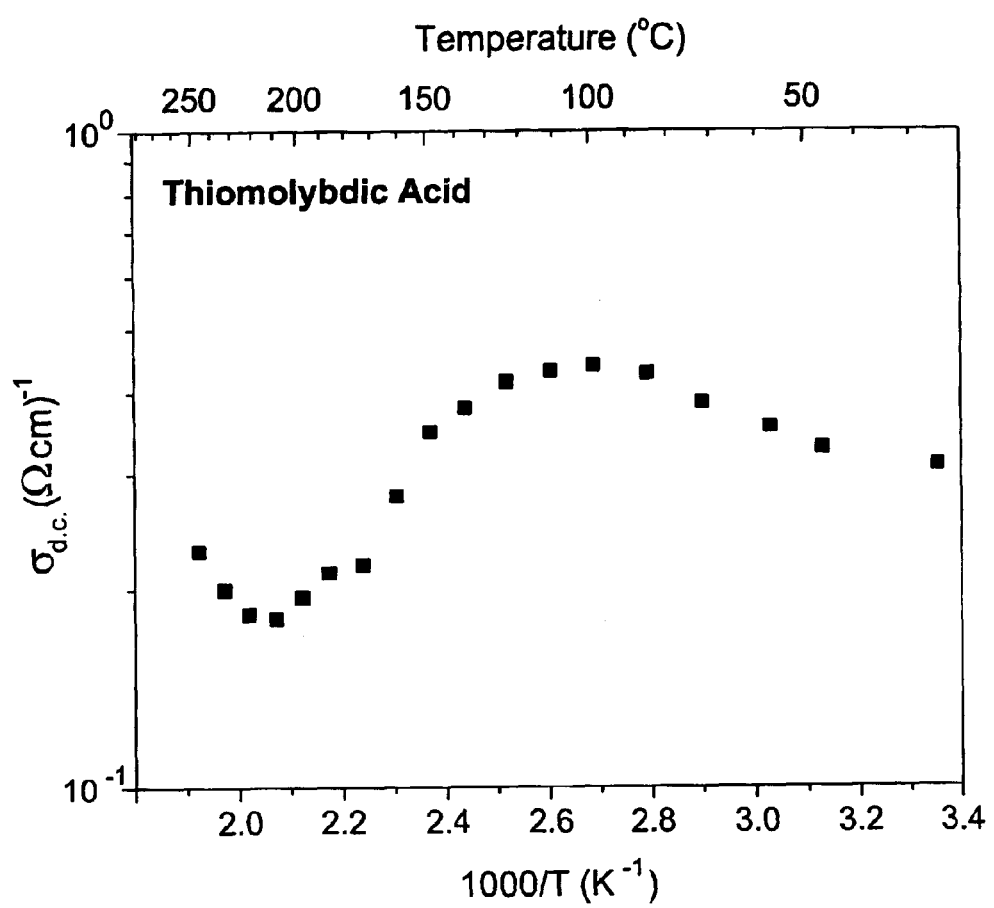
FIG. 8 is an Arrhenius temperature dependent plot of d.c. conductivity values for the thiomolybdic acid in an embodiment of the present invention.

The thiomolybdic acid reaction product appears to not only be an excellent proton conductor, but an excellent electron conductor as well (with a Fermi level within the d band gap) up to about 117° C. See FIG. 8, which is an Arrhenius temperature dependent plot of d.c. conductivity values for the thiomolybdic acid in an embodiment of the present invention. Thermal decomposition was observed above approximately 95° C., a corresponding decrease in conductivity was associated with the loss of the mobile proton species as $H_2S$. This compound may be dimolybdenim pentasulfide with intercalate $H_2S$, i.e. $2Mo_2S_5 \cdot 3H_2S$, or $H_2MoS_4$. Incoherent neutron scattering may be particularly useful in characterizing the proton dynamics of this system.

EXAMPLE 4
Hydrogen Alkali Thiogermanates from Sulfide Precursors

All test conditions were as described above in Example 1. However, in this test, anhydrous compounds of the form $H_xM_{4-x}Ge_4S_{10}$ (M=K and Rb) and $H_xCs_{4-x}Ge_4S_{10} \cdot yH_2S$ for $0<x \leq 4$ and $0 \leq y \leq 1$ were synthesized by reacting the respective alkali thiogermanate glass (0.5 to 0.75 g) or adamantane-like crystalline phase (0.5 to 0.75 g) with liquid $H_2S$. These reactions were done at room temperature (about 25° C.) with liquid $H_2S$ (8 to 17 g) at its vapor pressure of about 267 psia. The resulting reaction product was dependent on reaction time (4 to 28 days), shorter times produces adamantane-like protonated cage structures, whereas longer times produced unprotonated high temperature 3-D $\alpha$-$GeS_2$ crystal structures.

The anhydrous reaction route may be written as follows:

$M_{4-x}Ge_4S_{10-x/2}$(adamantane-like, glassy)+$zH_2S \rightarrow H_xM_{4-x}Ge_4S_{10}\{\cdot yH_2S\}$(adamantane-like)+$(z-y-x/2)H_2S \rightarrow M_{4-x}Ge_4S_{10-x/2}$($\alpha$-$GeS_2$ structure)+$zH_2S$ wherein $0<x \leq 4$; $0 \leq y \leq 1$ and $z \geq y+1/2x$.

For shorter reaction times, the reaction product was hydrogen alkali thiogermanate. These protonate phases were observed to thermally decompose around about 175° C.; below the decomposition, the ionic conductivity was attributed to a free-proton transport mechanism. (See FIG. 7). Ionic conductivity is shown in regions with distinguishable proton mobility, and higher temperature mobility may be attributed to the alkali. Anomalous behavior is a function of thermal history and the decomposition process.

EXAMPLE 5
Composite Proton Conductors from Oxide and Sulfide Precursors

All test conditions were as described above in Example 1. However, in this test, protonated glass-ceramics and ceramics were produced from liquid $H_2S$ reactions with various glassy and crystalline $GeS_2$ compositions. Specific examples include $0.14 \ Ga_2S_3 + 0.86 \ GeS_2$ and $0.05 \ MoS_2 + 0.95 \ GeS_2$ materials that were synthesized in evacuated silica tubes. These materials (about 0.5 g) were then reacted at room temperature (about 25° C.) for extended time periods (14 to 84 days) with $H_2S$ (8 to 17 g) at its vapor pressure of about 267 psia.

Figure 9:
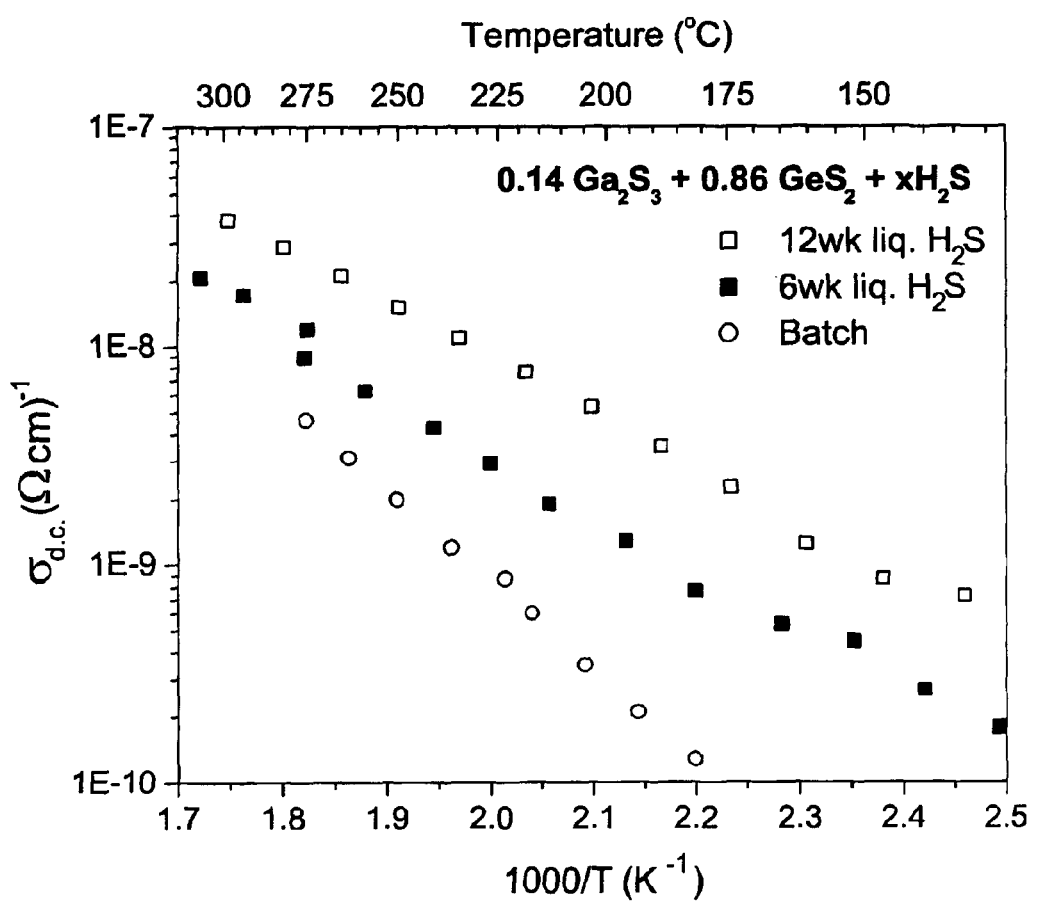
FIG. 9 is an Arrhenius temperature dependent plot of d.c. conductivity values for the $0.14Ga_2S_3+0.86GeS_2+xH_2S$ system in an embodiment of the present invention.
Figure 10:
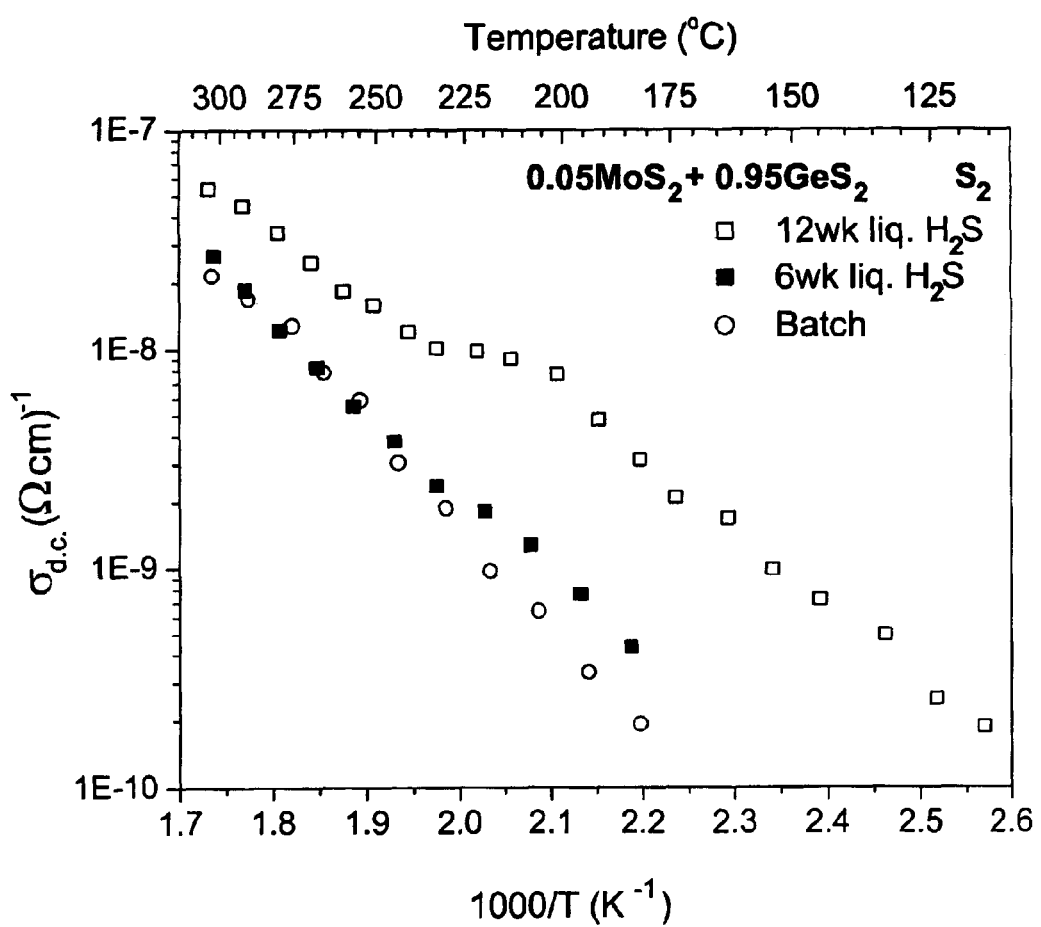
FIG. 10 is an Arrhenius temperature dependent plot of d.c. conductivity values for the $0.05MoS_2+0.95GeS_2+xH_2S$ system in an embodiment of the present invention.

The resulting products had S—H groups formed associated with the $Ge_4S_{10}^{4-}$ and Mo—S non-bridging sites. The higher conductivity values associated with longer reaction times are a result of higher proton concentrations and decreased bonding energies. See, for example FIGS. 9 and 10. FIG. 9 is an Arrhenius temperature dependent plot of d.c. conductivity values for the $0.14Ga_2S_3 + 0.86GeS_2 + xH_2S$ system in an embodiment of the present invention. Higher proton conductivity values and more protonation, x, were realized with increased reaction time with liquid $H_2S$. The glassy precursor became a glass ceramic protonated product or membrane material after the reaction. FIG. 10 is an Arrhenius temperature dependent plot of d.c. conductivity values for the $0.05MoS_2 + 0.95GeS_2 + xH_2S$ system in an embodiment of the present invention. Higher proton conductivity values and more protonation, x, were realized with increased reaction time with liquid $H_2S$. The glassy precursor became a glass ceramic protonated product after the reaction. The trend of decreasing activation energy with increasing reaction time is also noticeable in FIGS. 9 and 10.

To date, $GeS_2$ compositions with the adamantane-like microstructure have been the most successful with regard to protonation and conductivity. Similar to oxide chemistries, perovskite-like microstructures of $ABS_3$ (A=Ca, Sr, Ba, etc.; B=Zr, Ce, etc.) might also work for trivalent anion doping, protonation, and conduction using a variety of starting chemistries and structures.

EXAMPLE 6
Mixed Protonated Sulfide Materials from Oxide Precursors

All test conditions were as described above in Example 1. However, in this test, anhydrous compositions of the form $H_xM_yS_z$ (M=As, Sb, Bi, Ga, In, V, W; x<<1) were produced from liquid $H_2S$ reactions with oxide precursors of $As_2O_3$, $Sb_2O_3$, $Bi_2O_3$, $Ga_2O_3$, $In_2O_3$, $V_2O_5$, and $WO_3$, respectivley. The oxide precursors (about 0.5 g) were reacted at room temperature (about 25° C.) for extended times (7 to 21 days) with $H_2S$ (8 to 17 g) at its vapor pressure of about 267 psia. The resulting products from shorter reaction times typically had defect amounts of M—O—M and S—H groups noted from structural vibrational characterizations. Longer reaction times tended to produce more homogenous sulfide phases. The removal of the intercalated water from the reaction products may be facilitated through vacuum drying, i.e. heating the samples about 100° C. with about 100 mTorr vacuum for a day. The products may be further purified (if so desired) by repeating the $H_2S$ reaction procedure.

Conclusion

The present invention provides new compounds formed by reacting liquid hydrogen chalcogenides, for example, $H_2S$, with chalcogenide precursors, for example, oxide, sulfide, and/or hydroxide compounds. To date, these new compounds include thiogermanic acids and a thiomolybdic acid, although it is likely other new chalcogenide-acids, as well as other new chalcogenide and hydrochalcogenide compounds can also be made using not only the aforementioned precursors, but also fluoride, chloride, iodide and bromide precursors, as well as any combination of precursors.

It is also possible to optimize chalcogenide host materials in terms of thermal and chemical stability into which the greatest concentration of protons can be incorporated. Thus far, $GeS_2$-based materials have been the most successful, although the invention is not so limited. It is expected that several other chalcogenide materials will also be successful. Proton conductivity in the glasses and glass-ceramic and ceramic membrane materials has been determined through impedance measurements as a function of temperature and frequency. DC polarization experiments have been used to determine the electronic verses ionic conductivity of the

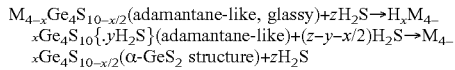

samples; all data reported here is predominately ionic in nature, except the thiomolybdic acid. Physical properties of the membrane materials have been determined, including decomposition, sublimation, crystallization, and glass transition temperatures. Structural comparisons have been used to examine stability with exposure to $H_2O$ and $O_2$.

Although the present invention has been described in considerable detail with reference to certain preferred versions thereof, other versions are possible. Therefore, the spirit and scope of the appended claims should not be limited to the description of the preferred embodiments contained herein.

What is claimed is:

1. A compound comprising:

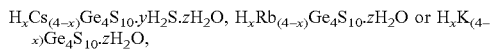
$H_xCs_{(4-x)}Ge_4S_{10} \cdot yH_2S \cdot zH_2O$, $H_xRb_{(4-x)}Ge_4S_{10} \cdot zH_2O$ or $H_xK_{(4-x)}Ge_4S_{10} \cdot zH_2O$, wherein $0 < x \leq 4$;

$0 \leq y \leq 1$; and $z \geq 0$.

2. The compound of claim 1 wherein x=4.

3. The compound of claim 1 wherein z=0.

4. The compound of claim 3 comprising a compound having a double-decker structural unit.

5. The compound of claim 4 wherein the double-decker compound is $H_2Ge_4S_9$.

6. The compound of claim 3 comprising a compound having an adamantane-like structural unit.

7. The compound of claim 6 wherein the adamantane-like compound is $H_4Ge_4S_{10}$.

8. The compound of claim 1 wherein z>0.

9. The compound of claim 8 comprising a compound having a double-decker structural unit.

10. The compound of claim 9 wherein the double-decker compound is $H_4Ge_4S_{10} \cdot xH_2O$ wherein $0 < x < 9$.

11. The compound of claim 8 comprising a compound having an adamantane-like structural unit.

12. The compound of claim 11 wherein the adamante compound is $H_4Ge_4S_{10} \cdot xH_2O$ wherein $0 < x < 9$.

13. The compound of claim 1 wherein the proton conductivity is between about $10^{-8}$ S/cm and $10^{-1}$ S/cm within a temperature range of between about −50 and 500° C.

* * * * *

UNITED STATES PATENT AND TRADEMARK OFFICE
CERTIFICATE OF CORRECTION

PATENT NO.        : 7,018,604 B2                                    Page 1 of 2
APPLICATION NO. : 10/627584
DATED              : March 28, 2006
INVENTOR(S)       : Poling et al.

It is certified that error appears in the above-identified patent and that said Letters Patent is hereby corrected as shown below:

On the Title page, in item (54), in "Title", after "MEMBRANES" delete "AND METHODS OF MAKING SAME".

On the page, in item (56), References Cited, under "Other Publications", in column 2, line 16, delete "356-65." and insert - - 357-65. - -, therefor.

On page 2, in item (56), References Cited, under "Other Publications", in column 1, line 24, delete "(HBS2)3" and insert - - $(HBS_2)_3$ - -, therefor.

On page 2, in item (56), References Cited, under "Other Publications", in column 2, line 24, delete "Reaction," and insert - - Reactions, - -, therefor.

On page 2, in item (56), References Cited, under "Other Publications", in column 2, line 36, delete "poly-perflurosulfonate" and insert - - poly-perfluorosulfonate - -, therefor.

In column 1, lines 2-3, after "MEMBRANES" delete "AND METHODS OF MAKING SAME".

In column 5, line 24, delete "10⁻3" and insert - - $10^{-3}$ - -, therefor.
In column 7, line 24, delete "0.25 in and" and insert - - 0.25 inches and - -, therefor
In column 8, line 1, delete "in in" and insert - - inches in - -, therefor.
In column 10, line 2, delete "CsSH" and insert - - CsSH, - -, therefor.
In column 10, line 2, insert - - or - - before "$Ba(SH)_2 \cdot xH_2O$,".
In column 10 (Table 1, Col. 1), line 5, delete "MoO3" and insert - - $MoO_3$ - -, therefor.
In column 12, line 16, delete "3.5 in in" and insert - - 3.5 inches in - -, therefor.
In column 12, line 18, delete "1.05 in and" and insert - - 1.05 inches and - -, therefor.

UNITED STATES PATENT AND TRADEMARK OFFICE
CERTIFICATE OF CORRECTION

PATENT NO. : 7,018,604 B2
APPLICATION NO. : 10/627584
DATED : March 28, 2006
INVENTOR(S) : Poling et al.

It is certified that error appears in the above-identified patent and that said Letters Patent is hereby corrected as shown below:

In column 13, lines 17–18, delete "Alkali and Alkaline Earth Hydrosulfides from Hydroxide Precursors" and insert the same as Sub heading.
In column 16, line 32, delete "respectivley." and insert - - respectively. - -, therefor.

Signed and Sealed this

Twenty-ninth Day of August, 2006

JON W. DUDAS
*Director of the United States Patent and Trademark Office*